United States Patent
Kim et al.

(10) Patent No.: US 9,498,942 B2
(45) Date of Patent: Nov. 22, 2016

(54) SYSTEM FOR LAMINATING OPTICAL FILM AND METHOD FOR MANUFACTURING DISPLAY UNIT USING THE SAME

(71) Applicant: LG CHEM, LTD., Seoul (KR)

(72) Inventors: Kyoung-Sik Kim, Daejeon (KR); Cheon-Ho Park, Daejeon (KR); Suk-Jae Lee, Daejeon (KR); Eung-Jin Jang, Daejeon (KR); Yong-Seob Shin, Daejeon (KR); Jea-Han Ryoo, Daejeon (KR); Beom-Seok Lee, Daejeon (KR); Bong-Su Jeung, Daejeon (KR)

(73) Assignee: LG Chem, Ltd., Seoul (KR)

(*) Notice: Subject to any disclaimer, the term of this patent is extended or adjusted under 35 U.S.C. 154(b) by 88 days.

(21) Appl. No.: 14/556,956

(22) Filed: Dec. 1, 2014

(65) Prior Publication Data
US 2015/0246520 A1 Sep. 3, 2015

Related U.S. Application Data

(63) Continuation of application No. PCT/KR2014/003605, filed on Apr. 24, 2014.

(30) Foreign Application Priority Data

Feb. 28, 2014 (KR) ........................ 10-2014-0024688

(51) Int. Cl.
*B32B 37/18* (2006.01)
*B32B 38/18* (2006.01)
(Continued)

(52) U.S. Cl.
CPC ........... *B32B 37/18* (2013.01); *B32B 38/1816* (2013.01); *B32B 37/0053* (2013.01); *B32B 37/02* (2013.01); *B32B 38/0004* (2013.01); *B32B 38/10* (2013.01); *B32B 38/1833* (2013.01);
(Continued)

(58) Field of Classification Search
CPC . B32B 37/18; B32B 38/1816; B32B 37/053; B32B 37/02; B32B 38/10; B32B 38/1833; B32B 38/1858
See application file for complete search history.

(56) References Cited

U.S. PATENT DOCUMENTS 8,040,469 B2 * 10/2011 Nakamura .......... H01L 51/0004
313/512

(Continued)

FOREIGN PATENT DOCUMENTS

| EP | 2431309 A1 * | 3/2012 |
|---|---|---|
| JP | H1195028 A | 4/1999 |
| KR | 10-2004-002796 A | 1/2004 |
| KR | 10-2009-0060347 A | 6/2009 |
| KR | 10-2012-0038916 A | 4/2012 |

*Primary Examiner* — Jeff Aftergut
(74) *Attorney, Agent, or Firm* — Dentons US LLP

(57) ABSTRACT

A system for laminating an optical film according to an exemplary embodiment of the present disclosure includes a panel transfer unit to transfer a panel, a first laminating unit installed at an area where a transfer line of the panel passes, to laminate an optical film on a first surface of the panel along a first direction parallel to a transfer direction of the panel, a reverse unit to reverse the panel having the optical film laminated on the first surface, and a second laminating unit installed at an area where the transfer line of the panel passes, to laminate an optical film on a second surface of the panel reversed by the reverse unit along a direction perpendicular to the first direction. According to the present disclosure, in the process of attaching the optical film onto both sides of the panel, process efficiency may be increased.

18 Claims, 13 Drawing Sheets

(51) Int. Cl.
   *B32B 37/00*   (2006.01)
   *B32B 38/00*   (2006.01)
   *B32B 37/02*   (2006.01)
   *B32B 38/10*   (2006.01)

(52) U.S. Cl.
   CPC ........ *B32B38/1858* (2013.01); *B32B 2307/42* (2013.01); *B32B 2457/20* (2013.01); *B32B 2551/00* (2013.01); *Y10T 156/10* (2015.01); *Y10T 156/1339* (2015.01); *Y10T 156/1751* (2015.01)

(56) References Cited

U.S. PATENT DOCUMENTS

| | | | |
|---|---|---|---|
| 8,087,140 B2 * | 1/2012 | Koshio | B32B 38/10 156/351 |
| 2005/0016670 A1 | 1/2005 | Kanbara et al. | |
| 2009/0199950 A1 | 8/2009 | Kitada et al. | |
| 2012/0055622 A1 * | 3/2012 | Kitagawa | B32B 38/1808 156/229 |

* cited by examiner

<UPPER SURFACE>

SYSTEM FOR LAMINATING OPTICAL FILM AND METHOD FOR MANUFACTURING DISPLAY UNIT USING THE SAME

CROSS-REFERENCE TO RELATED APPLICATION

The present application is a continuation of International Application No. PCT/KR2014/003605 filed on Apr. 24, 2014, which claims priority to Korean Patent Application No. 10-2014-0024688 filed in the Republic of Korea on Feb. 28, 2014, the disclosures of which are incorporated herein by reference.

TECHNICAL FIELD

The present disclosure relates to a system for laminating an optical film and a method for manufacturing a display unit using the same, and more particularly, to a system for attaching an optical film that may increase procedural efficiency and efficiency in aspect of spatial utilization in a process of attaching an optical film onto both surfaces of a panel constituting a display device, and a method for manufacturing a display unit using the same.

BACKGROUND ART

For use in a display device, a display unit implemented by attaching an optical film such as a polarizing film onto both surfaces of a panel is manufactured by a manufacturing system, and FIG. 1 illustrates conceptually a part of a system for manufacturing a display unit according to a related art, and FIG. 2 illustrates a process of manufacturing a display unit using a manufacturing system.

Referring to FIGS. 1 and 2, a display unit is obtained by providing, to a panel 3, an optical film 2 with a release sheet 1 attached on one surface using a roll, cutting the optical film 2 into a size corresponding to the panel 3, and laminating the optical film 2 on one surface of the panel while removing the release sheet 1 attached to the optical film 2, and subsequently, laminating the optical film 2 on the other surface of the panel 3 through the same process.

Meanwhile, referring to FIGS. 3 and 4, in case in which the optical film 2 to be attached to the panel 3 corresponds to a polarizing film, when attaching a polarizing film onto both surfaces of the panel 3, polarizing films should be attached such that absorption axes are perpendicular to each other, and to do so, a process of rotating the panel 3 is needed.

To perform this additional process, addition of an apparatus for rotating the panel is required, and the addition of the apparatus results in a complicated process line, causing a reduction in spatial efficiency and productivity.

DISCLOSURE

Technical Problem

The present disclosure is designed to solve the above problem, and therefore, the present disclosure is directed to increasing process efficiency in a process of attaching an optical film onto both surfaces of a panel.

However, the object of the present disclosure is not limited to the above object, and other objects of the present disclosure will become apparent to those skilled in the art from the following description.

Technical Solution

To achieve the above object, a system for laminating an optical film according to an exemplary embodiment of the present disclosure includes a panel transfer unit to transfer a panel, a first laminating unit installed at an area where a transfer line of the panel passes, to laminate an optical film on a first surface of the panel along a first direction parallel to a transfer direction of the panel, a reverse unit to reverse the panel having the optical film laminated on the first surface, and a second laminating unit installed at an area where the transfer line of the panel passes, to laminate an optical film on a second surface of the panel reversed by the reverse unit along a direction perpendicular to the first direction.

The panel transfer unit may include a conveyor belt to support and convey the panel.

The panel transfer unit may include a transfer roller to support and convey the panel.

The panel transfer unit may have a width corresponding to a width of the panel.

The first laminating unit may include a first supply roll to supply the optical film along a direction parallel to the first direction, and a first laminating drum to laminate the optical film supplied by the supply roll on the first surface of the panel.

The first laminating unit may include a first support roll to support the optical film to allow a release sheet to be separated from the optical film.

The first laminating drum may separate and adsorb the optical film from the release sheet supported by the first support roll, and may laminate the optical film on the first surface of the panel.

The first laminating drum may have an adsorption hole formed on a periphery.

An adsorption pad may be attached onto the periphery of the first laminating drum.

The first laminating unit may include a first collector roll to collect the release sheet along a direction parallel to the first direction.

The first laminating unit may include a first cutter disposed between the first supply roll and the first support roll to half-cut the optical film into a predetermined length.

The second laminating unit may include a second supply roll to supply the optical film along a direction perpendicular to the first direction, and a second laminating drum to laminate the optical film supplied by the supply roll on the second surface of the panel.

The second laminating unit may include a second support roll to support the optical film to allow a release sheet to be separated from the optical film.

The second laminating drum may separate and adsorb the optical film from the release sheet held by the second support roll, and may laminate the optical film on the second surface of the panel.

The second laminating drum may have an adsorption hole formed on a periphery.

An adsorption pad may be attached onto the periphery of the second laminating drum.

The second laminating unit may include a second collector roll to collect the release sheet along a direction perpendicular to the first direction.

The second laminating unit may include a second cutter disposed between the second supply roll and the second support roll to half-cut the optical film into a predetermined length.

The panel transfer unit may include a first panel transfer unit to transfer the panel along the first direction, a second panel transfer unit to transfer the panel transferred by the first panel transfer unit along a direction perpendicular to the first direction, and a third panel transfer unit to transfer the panel transferred by the second panel transfer unit along a direction parallel to the first direction.

The first laminating unit and the reverse unit may be disposed at an area where the first panel transfer unit passes, and the second laminating unit may be disposed at an area where the second panel transfer unit passes.

The second laminating unit may include a second supply roll to supply the optical film along a direction perpendicular to the panel, a first direction change roll to change a direction to allow the optical film supplied by the supply roll to move along a direction parallel to the panel on the second surface of the panel, and a second laminating drum disposed between the optical film and the second surface of the panel.

The second laminating unit may include a film holder disposed opposite to the second laminating drum across the optical film to hold the release sheet to allow the release sheet attached to the optical film to be separated.

The second laminating unit may include a second cutter disposed between the second supply roll and the film holder to cut the optical film into a predetermined length.

Meanwhile, the above object may be also achieved by a method for manufacturing a display unit according to an exemplary embodiment of the present disclosure, and the method for manufacturing a display unit includes (a) supplying a panel for manufacturing a display unit, (b) laminating an optical film on a first surface of the supplied panel, (c) reversing the panel, and (d) laminating an optical film on a second surface of the panel along a direction perpendicular to a laminating direction of the optical film on the first surface.

Advantageous Effects

According to the present disclosure, in a process of attaching an optical film onto both surfaces of a panel, process efficiency may be increased.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an entire construction of a system for laminating an optical film according to an exemplary embodiment of the present disclosure is described with reference to FIG. 5.

Figure 1:
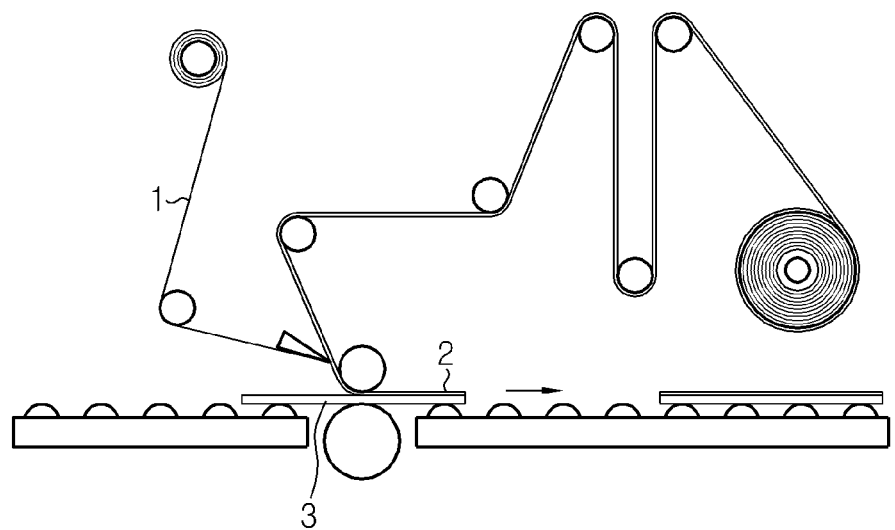
FIG. 1 is a conceptual diagram illustrating a system for laminating an optical film according to a related art.
Figure 2:
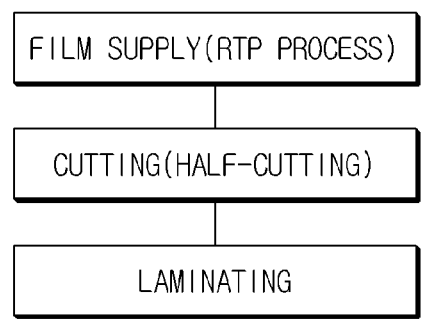
FIG. 2 is a flowchart illustrating a process according to a related art using the system for laminating an optical film shown in FIG. 1.
Figure 3:
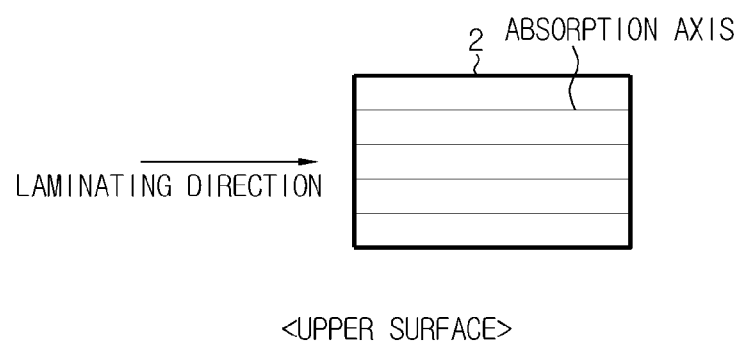
FIGS. 3 and 4 are diagrams illustrating a direction in which absorption axes of a pair of polarizing films each attached onto both sides of a panel shown in FIG. 1 are formed.
Figure 4:
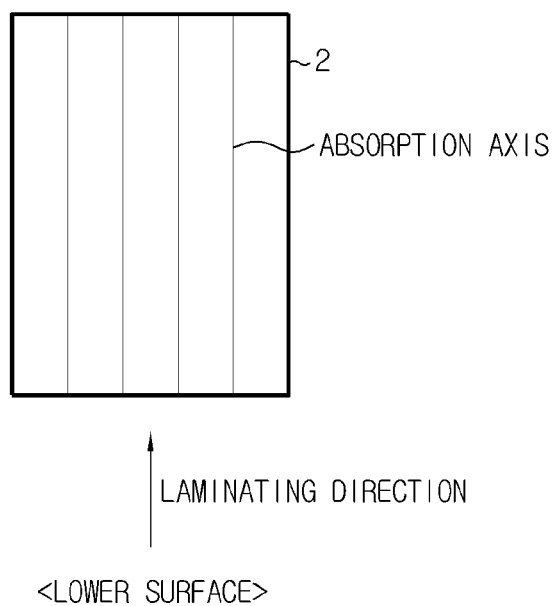
Figure 5:
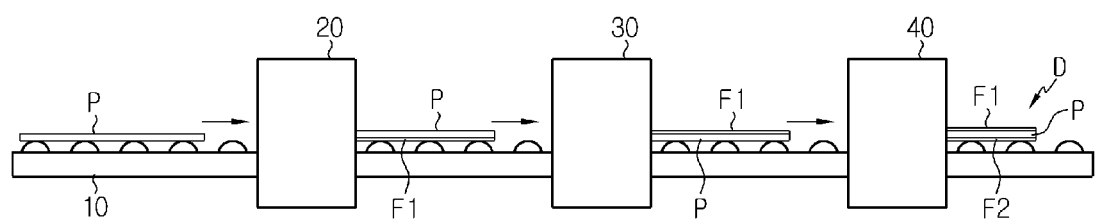
FIG. 5 is a conceptual diagram illustrating a system for laminating an optical film according to an exemplary embodiment of the present disclosure.

FIG. 5 is a conceptual diagram illustrating a system for laminating an optical film according to an exemplary embodiment of the present disclosure.

Referring to FIG. 5, the system for laminating an optical film according to an exemplary embodiment of the present disclosure includes a panel transfer unit 10, a first laminating unit 20, a reverse unit 30, and a second laminating unit 40.

The panel transfer unit 10 transfers, within the system, a panel P to which an optical film F is to be attached, and has a width corresponding to a width of the panel P.

As a means for supporting and conveying the panel P, various transfer means such as a conveyor belt or a transfer roller may be used without limitations.

The first laminating unit 20 and the second laminating unit 40 are installed at an area where a transfer line of the panel P passes, to laminate optical films F1 an F2 on a first surface and an opposing second surface of the panel P, respectively.

Specific functions and structures of the first laminating unit 20 and the second laminating unit 40 will be described below in more detail with reference to FIGS. 6 through 10.

First, a laminating direction on the first surface of the panel P and a laminating direction on the second surface are described with reference to FIG. 6.

Figure 6:
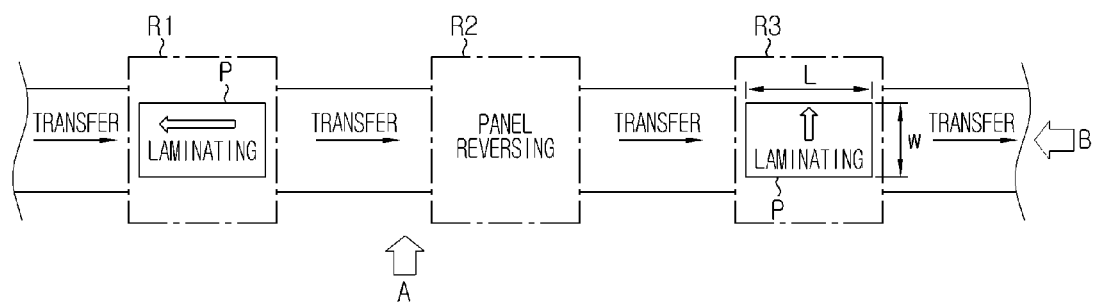
FIG. 6 is a diagram illustrating a transfer direction and a laminating direction of a panel by the system for laminating an optical film shown in FIG. 5.

FIG. 6 is a diagram illustrating a transfer direction and a laminating direction of a panel by the system for laminating an optical film shown in FIG. 5.

Referring to FIG. 6, the optical film F1 to be laminated on the first surface of the panel P and the optical film F2 to be laminated on the second surface are laminated along directions approximately perpendicular to each other.

That is, referring to FIGS. 5 and 6 together, the first laminating unit 20 laminates the optical film F1 on the first surface of the panel P along a direction parallel to a transfer direction of the panel P, while the second laminating unit 40 laminates the optical film F2 on the second surface of the panel P along a direction approximately perpendicular to the transfer direction of the panel P.

Different laminating directions of the optical films F1 and F2 on both surfaces of the panel P is because absorption axes formed for each of the optical films F1 and F2 should be perpendicular to each other, particularly, in case in which the optical films F1 and F2 attached onto both surfaces of the panel P are a polarizing film.

As described above, because the laminating directions of the optical films F1 and F2 attached onto both surfaces of the panel P are perpendicular to each other, a length L of the film F1 to be laminated on the first surface is equal to a width of the film F2 to be laminated on the second surface, and a width W of the film F1 to be laminated on the first surface is equal to a length of the film F2 to be laminated on the second surface.

Meanwhile, the first laminating unit 10 and the second laminating unit 30 may be installed in the same direction, when viewed with respect to the panel transfer unit 10.

That is, the system for laminating an optical film according to an exemplary embodiment of the present disclosure is provided with the reverse unit 20 installed between the first laminating unit 10 and the second laminating unit 30 to allow the laminating on the first surface and the second surface of the panel P to be all performed at a top or a bottom of the panel transfer unit 10.

Subsequently, a structure of the first laminating unit 20 is described in more detail with reference to FIG. 7.

Figure 7:
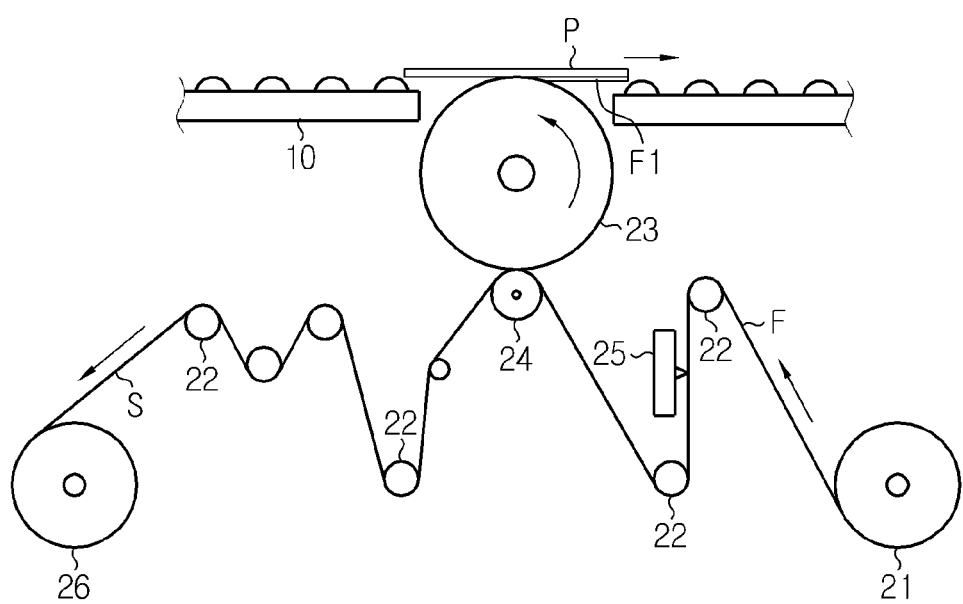
FIG. 7 is a diagram illustrating an example of implementation of a first laminating unit shown in FIG. 5, when viewed from A in FIG. 6.

FIG. 7 is a diagram illustrating an example of implementation of the first laminating unit shown in FIG. 5, when viewed from A in FIG. 6.

Referring to FIG. 7, the first laminating unit 20 may be implemented to include a first supply roll 21, on which the optical film F with the release sheet S attached onto one surface is wound, to supply the optical film F, and a first laminating drum 23 to laminate the optical film F supplied by the supply roll 21 on the first surface of the panel P.

The first laminating drum 23 has an approximately cylindrical shape, and is disposed between the panel P and the optical film F to separate the optical film F from the release sheet S and laminate the optical film F on the first surface of the panel P.

Figure 8:
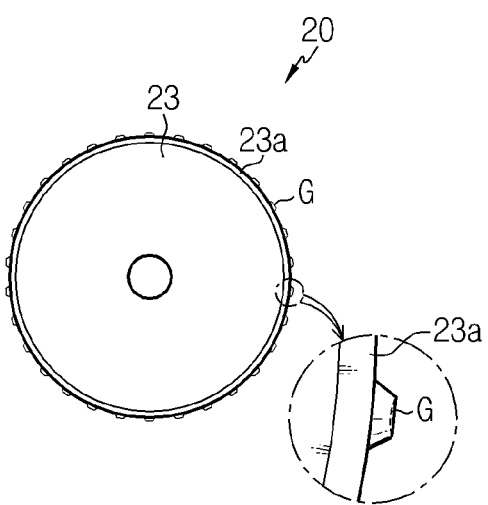
FIGS. 8 and 9 are diagrams illustrating an example of implementation of a laminating drum shown in FIG. 7.
Figure 9:
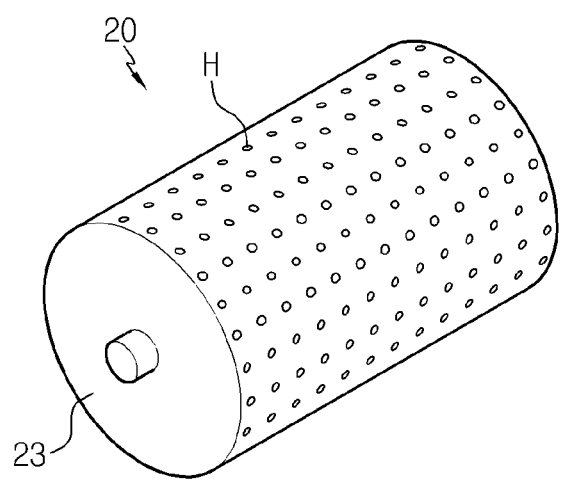

Meanwhile, the first laminating drum 23 may have various adsorption structures for attaching the optical film F on the periphery thereof, and an example of the adsorption structure is illustrated in FIGS. 8 and 9.

First, referring to FIG. 8, the first laminating drum 23 may have a plurality of adsorption holes H formed on the periphery. In this case, an inner space of the first laminating drum 23 may be connected to a vacuum pump (not shown), and as the vacuum pump operates, the optical film F may be adsorbed onto the periphery of the first laminating drum 23.

Subsequently, referring to FIG. 9, an adsorption pad 23a having a plurality of adsorption grooves G may be attached onto the periphery of the first laminating drum 23.

As described above, with the surface structure capable of adsorbing the optical film F, the first laminating drum 23 adsorbs the optical film F separated from the release sheet S onto the periphery, and then moves toward the panel P and laminates the optical film F on the first surface of the panel P along the direction of the width W of the panel P.

In this instance, adhesion between the panel P and the optical film F is achieved by an adhesive layer formed on a surface where the release sheet S has been attached among both surfaces of the optical film F.

Referring back to FIG. 7, the first laminating unit 20 may further include at least one first tension roll 22 to maintain tension of the optical film F between the first supply roll 21 and a first laminating drum 22.

Also, the first laminating unit 20 may include a first support roll 24 to support the optical film F in a state that the first support roll 24 faces the first laminating drum 23 to allow the release sheet S to be separated from the optical film F, and in this case, may further include a first collector roll 26 to collect the separated release sheet S along a direction parallel to the transfer direction of the panel P.

Additionally, the first laminating unit 20 may further include a first cutter 25 disposed between the first supply roll 21 and the first support roll 24 to half-cut the optical film F into a predetermined length.

Here, half-cutting represents cutting only the optical film F while leaving the release sheet S intact, when tailoring the optical film F with the attached release sheet S into a predetermined length. Half-cutting allows for continuous supply and laminating of the optical film F using a roll.

Subsequently, a structure of the second laminating unit 40 is described in more detail with reference to FIG. 10.

Figure 10:
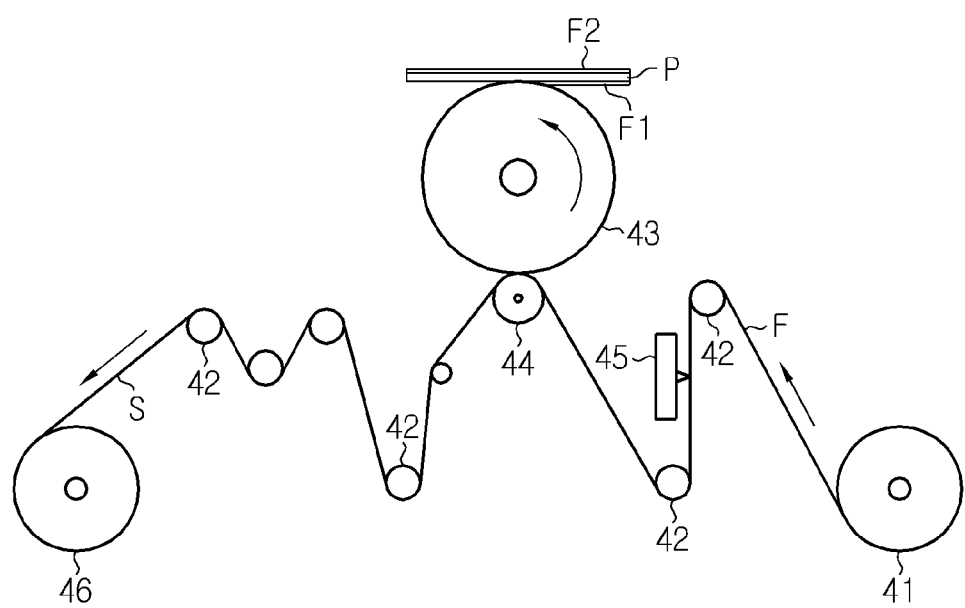
FIG. 10 is a diagram illustrating an example of implementation of a second laminating unit shown in FIG. 5, when viewed from B in FIG. 6.

FIG. 10 is a diagram illustrating an example of implementation of the second laminating unit shown in FIG. 5, when viewed from B in FIG. 6.

Referring to FIG. 10, the second laminating unit 40 laminates the optical film F1 on the second surface of the panel P when the panel P having the optical film F1 laminated on the first surface is reversed by the reverse unit 30, and may be implemented to include a second supply roll 41, at least one second tension roll 42, a second laminating drum 43, a second support roll 44, a second cutter 45, and a second collector roll 46.

The components of the second laminating unit 40 are substantially the same as the components of the first laminating unit 20 described in the foregoing, but there is a difference in that supply of the optical film F2, collection of the release sheet S, and laminating on the second surface of the panel P are performed in a direction approximately perpendicular to the previous case of the first laminating unit 20.

Accordingly, a detailed description of each component of the second laminating unit 40 is omitted herein.

Subsequently, a system for laminating an optical film according to another exemplary embodiment of the present disclosure is described with reference to FIGS. 11 and 12.

Figure 11:
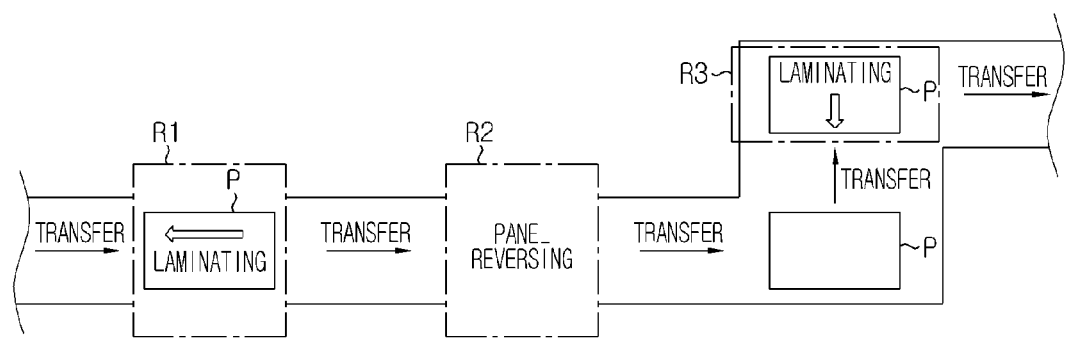
FIG. 11 is a diagram illustrating a transfer direction and a laminating direction of a panel by a system for laminating an optical film according to another exemplary embodiment of the present disclosure.
Figure 12:
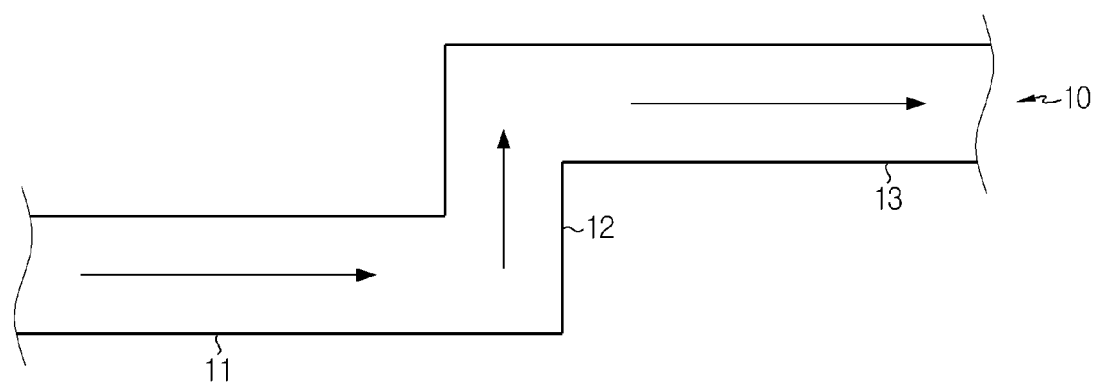
FIG. 12 is a diagram illustrating a structure of a panel transfer unit employed in a system for laminating an optical film according to another exemplary embodiment of the present disclosure.

FIG. 11 is a diagram illustrating a transfer direction and a laminating direction of a panel by a system for laminating an optical film according to another exemplary embodiment of the present disclosure, and FIG. 12 is a diagram illustrating a panel transfer unit employed in the system for laminating an optical film according to another exemplary embodiment of the present disclosure.

First, referring to FIG. 11, the system for laminating an optical film according to another exemplary embodiment of the present disclosure performs laminating on the first surface of the panel P in the process of transferring the panel P in a first direction, and after reversing the panel, performs laminating on the second surface of the panel P in the process of transferring the panel P along a direction approximately perpendicular to the first direction.

That is, referring to FIG. 12, the panel transfer unit 10 employed in the system for laminating an optical film according to another exemplary embodiment of the present disclosure may be implemented, to change the transfer direction of the panel P, to include a first panel transfer unit 11 to transfer the panel P along a first direction, a second panel transfer unit 12 to transfer the panel P transferred by the first panel transfer unit 11 along a direction perpendicular to the first direction, and a third panel unit 13 to transfer the panel transferred by the second panel transfer unit 12 along a direction parallel to the first direction.

In this case, within the system for laminating an optical film, the first laminating unit 20 and the reverse unit 30 are disposed at an area where the first panel transfer unit 11 passes, and the second laminating unit 40 is disposed at an area where the second panel transfer unit 12 passes.

As described in the foregoing, the system for laminating an optical film according to an exemplary embodiment of the present disclosure may eliminate a separator process of rotating the panel by allowing the laminating on the first surface and the second surface of the panel P to be performed along a direction approximately perpendicular to each other.

Also, the system for laminating an optical film according to an exemplary embodiment of the present disclosure is provided with the structure for reversing the panel P between laminating on the first surface of the panel P and laminating on the second surface, thereby allowing the first laminating unit 20 and the second laminating unit 30 to be all installed in the same direction (top or bottom) with respect to the transfer line, that is, the panel transfer unit 10, resulting in increased spatial efficiency of equipment.

Subsequently, a system for laminating an optical film according to another exemplary embodiment of the present disclosure is described with reference to FIG. 13.

Figure 13:
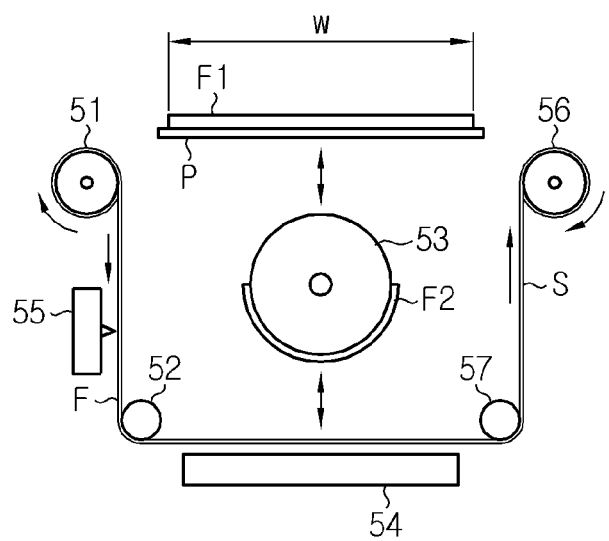
FIG. 13 is a diagram illustrating a structure of a second laminating unit employed in a system for laminating an optical film according to another exemplary embodiment of the present disclosure.

FIG. 13 is a diagram illustrating a structure of a second laminating unit employed in a system for laminating an optical film according to another exemplary embodiment of the present disclosure.

When compared to the previous embodiments, the system for laminating an optical film according to another exemplary embodiment of the present disclosure has substantially the same other components, with only a difference in the structure of the second laminating unit 50.

Accordingly, in the description of the system for laminating an optical film according to another exemplary embodiment of the present disclosure, the description is provided focusing on the structure of the second laminating unit 50, and a detailed description of other components overlapping with the previous embodiment is omitted herein.

Referring to FIG. 13, the second laminating unit 50 employed in the system for laminating an optical film according to another exemplary embodiment of the present disclosure may be implemented to include a second supply roll 51, a first direction change roll 52, a second laminating drum 53, a film holder 54, a second cutter 55, a second collector roll 56, and a second direction change roll 57.

The second supply roll 51, on which the optical film F2 having the release sheet S attached onto one surface is wound, supplies the optical film F2 along a direction approximately perpendicular to the panel P.

That is, the second supply roll 51 minimizes a space occupied by equipment by minimizing an overall width of the system for laminating an optical film required for supply of the optical film F2.

The second laminating drum 53 is disposed between the optical film F2 moving along a direction parallel to the panel P by the first direction change roll 52 changing a movement direction, and the second surface of the panel P.

The second laminating drum 53 has an approximately cylindrical shape, and separates the optical film F2 from the release sheet S and laminates the optical film F2 on the second surface of the panel P while moving between the panel P and the optical film F or being fixed.

Meanwhile, a specific structure of the second laminating drum 53 is the same as the previous embodiment described with reference to FIGS. 8 and 9, and its overlapping description is omitted herein.

The film holder 54 is disposed opposite to the laminating drum 53 across the optical film F2, and serves to support/hold the release sheet S to allow the release sheet S attached to the optical film F to be separated.

The film holder 54 is not limited to a specific structure as long as it has a structure capable of holding the release sheet S to allow the release sheet S to be separated from the optical film F2 when the second laminating drum 53 adsorbs the optical film F2 and rotates and/or moves. Besides, the substantially same structure as the support rolls 24 and 44 described in the previous embodiments may be applied to the film holder 54.

The second cutter 55 is disposed between the second supply roll 51 and the film holder 54, and cuts (half-cuts) only the optical film F2 into a predetermined length while leaving the release sheet S intact, to allow for continuous laminating of the optical film F2 for each panel P.

Here, a cutting length of the optical film F2 is determined based on the width W of the panel P, and as half-cutting is made to a size of the panel P, continuous laminating of the optical film F2 for each panel P may be enabled.

The second collector roll 56 collects the release sheet S separated from the optical film F along a direction perpendicular to the panel P, and the movement direction change of the release sheet S may be achieved by the second direction change roll 57 disposed between the film holder 54 and the second collector roll 56.

That is, the second direction change roll 57 serves to change a direction to allow the release sheet S separated from the optical film F2 to move to the second collector roll 56 along a direction perpendicular to the panel P.

That is, the system for laminating an optical film according to another exemplary embodiment of the present disclosure may minimize a width occupied by the system by collecting the release sheet S separated from the optical film F2 along a direction perpendicular to the panel P, thereby maximizing spatial efficiency of equipment.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A method for manufacturing a display unit, comprising:
   (a) supplying a panel for manufacturing a display unit;
   (b) laminating an first optical film on a first surface of the supplied panel along a first direction parallel to a transfer direction of the panel;
   (c) reversing the panel; and
   (d) laminating a second optical film on a second surface of the panel along a second direction which is perpendicular to the first direction and parallel to the surface of the panel;
   wherein step (d) comprises:
   (d1) supplying the second optical film along a direction perpendicular to the surface of the panel;
   (d2) changing a direction to allow the second optical film supplied by the second supply roll to move along the second direction with the second optical film facing the second surface of the panel;
   (d3) separating the second optical film from a second release sheet and laminating the second optical film on the second surface of the panel along the second direction;
   (d4) changing a direction to allow the second release sheet separated from the second optical film to move along the direction perpendicular to the surface of the panel; and
   (d5) collecting the second release sheet moving along the direction perpendicular to the surface of the panel.

2. A system for laminating an optical film, comprising:
   a panel transfer unit to transfer a panel;
   a first laminating unit installed at an area where a transfer line of the panel passes, to laminate a first optical film on a first surface of the panel along a first direction parallel to a transfer direction of the panel;
   a reverse unit to reverse the panel having the first optical film laminated on the first surface; and
   a second laminating unit installed at an area where the transfer line of the panel passes, to laminate a second optical film on a second surface of the panel reversed by the reverse unit along a second direction which is perpendicular to the first direction and parallel to the surface of the panel;
   wherein the second laminating unit comprises:
     a second supply roll to supply the second optical film along a direction perpendicular to the surface of the panel;
     a first direction change roll to change a direction to allow the second optical film supplied by the second supply roll to move along the second direction with the second optical film facing the second surface of the panel;
     a second laminating drum disposed between the second optical film facing the second surface of the panel and the second surface of the panel, wherein the second laminating drum separates the second optical film from a second release sheet and laminates the second optical film on the second surface of the panel along the second direction;
     a second direction change roll to change a direction to allow the second release sheet separated from the second optical film to move along the direction perpendicular to the surface of the panel; and
     a second collector to collect the second release sheet moving along the direction perpendicular to the surface of the panel.

3. The system for laminating an optical film according to claim 2, wherein the panel transfer unit includes a conveyor belt to support and convey the panel.

4. The system for laminating an optical film according to claim 2, wherein the panel transfer unit includes a transfer roller to support and convey the panel.

5. The system for laminating an optical film according to claim 2, wherein the panel transfer unit has a width corresponding to a width of the panel.

6. The system for laminating an optical film according to claim 2, wherein the first laminating unit comprises:
   a first supply roll to supply the first optical film along a direction parallel to the first direction; and
   a first laminating drum to laminate the first optical film supplied by the first supply roll on the first surface of the panel.

7. The system for laminating an optical film according to claim 6, wherein the first laminating unit comprises a first support roll to support the first optical film to allow a first release sheet to be separated from the first optical film.

8. The system for laminating an optical film according to claim 7, wherein the first laminating drum separates and adsorbs the first optical film from the first release sheet supported by the first support roll, and laminates the first optical film on the first surface of the panel.

9. The system for laminating an optical film according to claim 8, wherein the first laminating drum has an adsorption hole formed on a periphery.

10. The system for laminating an optical film according to claim 8, wherein an adsorption pad is attached onto the periphery of the first laminating drum.

11. The system for laminating an optical film according to claim 6, wherein the first laminating unit comprises a first collector roll to collect the first release sheet along a direction parallel to the first direction.

12. The system for laminating an optical film according to claim 7, wherein the first laminating unit comprises a first cutter disposed between the first supply roll and the first support roll to half-cut the first optical film into a predetermined length.

13. The system for laminating an optical film according to claim 2, wherein the second laminating drum has an adsorption hole formed on a periphery.

14. The system for laminating an optical film according to claim 2, wherein an adsorption pad is attached onto the periphery of the second laminating drum.

15. The system for laminating an optical film according to claim 2, wherein the panel transfer unit comprises:
   a first panel transfer unit to transfer the panel along the first direction;
   a second panel transfer unit to transfer the panel transferred by the first panel transfer unit along a direction perpendicular to the first direction; and
   a third panel transfer unit to transfer the panel transferred by the second panel transfer unit along a direction parallel to the first direction.

16. The system for laminating an optical film according to claim 15, wherein the first laminating unit and the reverse unit are disposed at an area where the first panel transfer unit passes, and the second laminating unit is disposed at an area where the second panel transfer unit passes.

17. The system for laminating an optical film according to claim 2, wherein the second laminating unit comprises a film holder disposed opposite to the second laminating drum across the second optical film to hold the second release sheet to allow the second release sheet attached to the second optical film to be separated.

18. The system for laminating an optical film according to claim 17, wherein the second laminating unit comprises a second cutter disposed between the second supply roll and the film holder to cut the second optical film into a predetermined length.

* * * * *